United States Patent [19]

Dablain

[11] Patent Number: 4,953,140
[45] Date of Patent: Aug. 28, 1990

[54] METHOD OF SUBTERRANEAN MAPPING

[75] Inventor: Mark A. Dablain, Plano, Tex.

[73] Assignee: Mobil Oil Corporation, New York, N.Y.

[21] Appl. No.: 396,398

[22] Filed: Aug. 21, 1989

[51] Int. Cl.$^5$ .............................................. G01V 1/28
[52] U.S. Cl. ....................................... 367/73; 364/421
[58] Field of Search ...................... 367/59, 61, 73, 50, 367/51, 21, 36, 37; 364/421

[56] References Cited

U.S. PATENT DOCUMENTS

| | | | |
|---|---|---|---|
| 4,415,999 | 11/1983 | Moeckel et al. | 367/73 |
| 4,464,737 | 8/1984 | Pann | 367/49 |
| 4,479,205 | 10/1984 | Grey | 367/63 |
| 4,839,869 | 6/1989 | Corcorca | 367/53 |

OTHER PUBLICATIONS

"Depth Migration of Complex Offshore Seismic Profiles," Larner et al., Offshore Technology Conference, 1978, Texas.
"Velocity Analysis Using Prestack Migration", K. Al-Yahya and Francis Muir, SEP-38 (Standford Exploration Project, vol. 38), pp. 105-112 (1984).
"Velocity Analysis Using Prestack Migration: Applications", Al-Yahya & Muir, SEP-41, pp. 121-147.
"Velocity Analysis By Iterative Profile Migration", Al-Yahya, SEP-53, pp. 1-76 (1987).

*Primary Examiner*—Ian J. Lorbo
*Attorney, Agent, or Firm*—Alexander J. McKillop; Charles J. Speciale; George W. Hager, Jr.

[57] ABSTRACT

An improved method for modeling the subterranean structure of the earth is disclosed. Assumed velocities are used in initially modeling the path of seismic energy through the subterranean structure. Arrays of travel times corresponding to upward and downward going energy from various locations in the subterranean structure are calculated using ray tracing techniques. Actual reflection points are located when the sum of the upward and downward going travel times calculated with respect to a particular point in the structure equals the actual travel times recorded. The velocity assumptions are verified by selecting common reflection point records and adjusting the assumed velocities, such that reflection events on displayed traces from the common reflection point are horizontal. A least squares fit is used to correct the common reflection point event data until it is optimally flat.

4 Claims, 4 Drawing Sheets

METHOD OF SUBTERRANEAN MAPPING

Field of the Invention

This invention relates to an improved method for modeling the subterranean structure of the earth. More particularly, the invention relates to an improved method for determining the correct velocity of seismic energy within the earth and using this to generate improved models of the subterranean structure of the earth.

Background of the Invention

It is presently common to perform seismic exploration of the earth. In such processes, seismic energy is imparted to the earth at a first location termed the shotpoint. In land-based exploration, this can be done by detonating a charge of dynamite, by dropping a heavy weight, or by imparting the vibration of a massive object to the ground. In ocean-going exploration, the energy is commonly provided by compressed air "guns". In either case, the seismic energy travels into the earth and is reflected at the interfaces between various rock layers. The reflected energy travels back up to the surface of the earth and is detected.

In seagoing exploration the detection is accomplished by a towed "streamer" of "hydrophones". In land-based exploration, the detection step is accomplished by a "spread" of "geophones". These detecting devices provide output signals or "traces" which vary in amplitude as a function of time. A "wiggle" or "wavelet" in the amplitude of this signal indicates return of a pulse of seismic energy after reflection from a particular interface within the earth.

In a typical seismic exploration operation, energy is imparted to the earth at a first shot point location $x_0$, and recorded at a number of geophone locations spaced distances $x_1, x_2, \ldots x_n$ from $x_0$. These "offset" distances are up to the order of several kilometers from the shot point. The shot point is then moved some distance, e.g., fifty meters along the "spread" of geophones, and the process repeated. The traces recorded with respect to each of the geophones are stored separately with respect to each of the shotpoints. This allows individual traces to be selected for subsequent processing.

A typical initial processing step is that of "normal move-out" correction, in which the individual traces are time compressed or stretched to compensate for the different travel distance of the seismic energy at greater detector offsets, i.e., at greater shotpoint-to-detector distances. When the corrected traces are plotted next to one another in order corresponding to the location of the corresponding detectors with respect to the shot point, the "wiggles" in the traces line up, indicating an interface between rock layers within the earth. The shape of the interface can then be analyzed by geophysicists in the search for oil, gas and other valuable minerals.

The output signal from each of the detectors is recorded as a function of time. In order that this data can be translated into amplitude versus depth information such that the picture generated by displaying the traces actually corresponds to the depth of the interfaces within the earth, the velocity of the seismic energy through the subterranean structure must be determined. Accurate velocity estimates are also required for normal move-out correction. Accordingly, in order to provide accurate pictures of the subterranean structure of the earth, improved methods of determining the correct velocity of the seismic energy in the subterranean formation are required.

The term "prestack depth migration" refers to correction of a record recorded as a function of time for the velocity of the wave in the subterranean structure. In this process one can convert a number of offset versus time records to offset versus depth records, which can then be displayed to yield a realistic picture of the structure. For example, in many seismic operations "CDP gathers", that is, collections of records recorded with respect to differing shotpoint and detector pairs but all involving energy reflected from a "common depth point" (CDP), that is, a particular point on a particular interface between rock layers, are selected for processing. If the velocity of the seismic energy in each of the subterranean layers was chosen correctly, after prestack depth migration, the "wiggles" (evidencing a reflection event) of each CDP trace of a gather corresponding to a true common depth point are at the same distance from the surface. Therefore, when the traces of the CDP gather are graphed next to one another the wiggles should line up, forming a horizontal line. If the velocities were incorrect, the wiggles either form an upward curving line (a "smile") or a downwardly curving line (a "frown"). This was recognized by Al-Yahya and Muir, "Velocity Analyses Using Prestack Migration", SEP-38 (Stanford Exploration Project volume 38), pp. 105-112 (1984).

The purpose of the work of Al-Yahya et al is to determine the correct seismic velocities, thus yielding an improved subterranean model, using wave equation techniques. According to this technique, one mathematically models the transmission of a hypothetical wave of seismic energy into the earth at a particular shotpoint location, treating the energy propagation as a wave field. The wave equation is then similarly used to back-propagate hypothetical seismic data in depth; in this step, the wave equation is used to model propagation of the energy downwardly from the receiver locations. This process is used to generate true common depth point gathers; that is, the move-out in these "synthetic" gathers, as indicated by the presence or absence of smiles and frowns, is used to correct the seismic velocities in order to construct a better model of the earth.

The overall process is discussed in Al-Yahya et al, supra and in more detail in Al-Yahya, "Velocity Analysis By Iterative Profile Migration", Stanford University Ph.D. Thesis (August 1987). See also Al-Yahya et al, "Velocity Analysis Using Prestack Migration: Applications", SEP-41 (1987). FIG. 20 of this paper on page 147 outlines the process used by Al-Yahya et al for this purpose.

In the Al-Yahya et al SEP-38 paper mentioned, the suggestion is made that the wave equation technique of modeling the propagation of the energy through the earth can be replaced in part by a ray tracing method. See page 108, where it is stated that steps 3-6 of the Al-Yahya et al method, which involve wave equation modeling of the seismic energy transmission within the earth, could be replaced by ray tracing. Al-Yahya et al suggests that "we . . . downward continue . . . the geophones" (i.e., use the wave equation technique to back-propagate the detected energy, that is, to effectively model the transmission of the energy upwardly after reflection) but "instead of downward [continuing] the sources, we use the imaging principle" (i.e. ray trace downwardly from the source). Thus, Al-Yahya et al suggest at this point only that ray tracing techniques can be used for modeling the downward travel of the wave energy.

Summary of the Invention

The object of this invention is to provide an improved and simplified method of modeling the subterranean structure of the earth, employing improved velocity calculation techniques. Ray tracing techniques are used with respect to both the downward and upward paths of the energy. In an initial step, initial assumptions are made concerning the structure of the earth in the region of interest and the velocity of seismic energy therein. A modeled ray is traced into the earth at initial input angles varying, e.g., by 1°. Using these velocity and structure assumptions, the paths of the various rays through the subterranean structure are calculated. More specifically, a two-dimensional data array is defined, the points of which correspond to points in a vertical plane in the modeled structure extending beneath the line connecting the shotpoints and spread of geophones. The travel times to each of the points in the plane from the shot point are calculated and stored in the array. Ray tracing techniques are then used to similarly calculate the upward travel time from points in a second, similar array, corresponding to the same points in the plane, to the detectors.

The total travel time (i.e., the downward travel time plus the upward travel time) for each actual ray can be determined from the recorded data. Accordingly, the travel times stored at the corresponding locations in the downward-going and upward-going arrays (i.e., at the points in the two arrays corresponding to the same point in the subterranean structure) are compared to determine those points in the plane at which the sum of the downward and upward travel times calculated with respect to the appropriate shotpoint and detector locations is equal to the actual total travel time. The downward and upward rays which correspond to those points in the arrays then correspond to the path of travel of the actual ray. Additional rays corresponding to common depth point gathers, i.e., using data from other shotpoint and receiver pairs generated using this model are then similarly located, and synthetic CDP gathers are plotted. The "smile"/"frown" analysis is performed to determine whether the velocity assumptions made were substantially correct. If the velocity assumptions used were correct, the "wiggles" in these traces will be horizontal, since they all involve reflection from a single point. If they are not horizontal, the model is updated, the rays retraced, the common depth point gathers recalculated, and the process repeated until the common depth point gathers are flat and contain no smiles or frowns. The process is repeated for a large number of shot points and detector locations; ultimately, the updated model indicates the actual structure.

In the preferred embodiment a least squares inversion method is used to correct the velocity assumptions used in tracing the model rays and recalculating the common image point gathers.

Brief Description of the Drawings

The invention will be better understood if reference is made to the accompanying drawings, in which.

Description of the Preferred Embodiments

Figure 1:
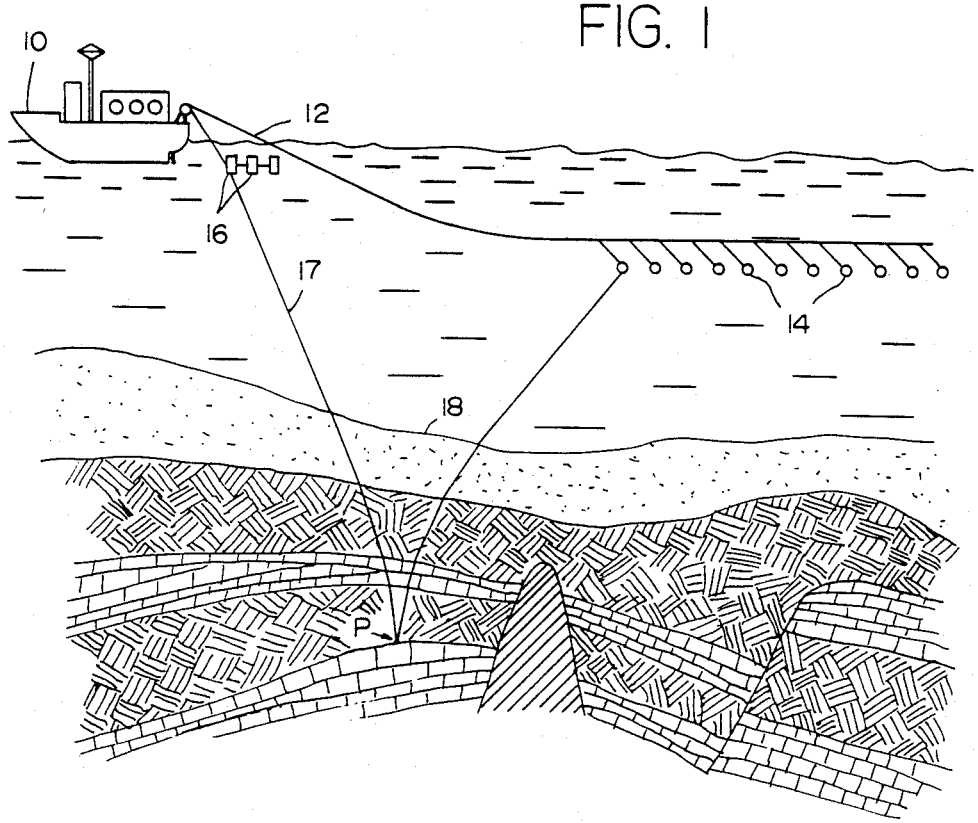
FIG. 1 shows schematically a typical ocean-going seismic exploration operation.

FIG. 1 shows schematically a typical ocean-borne seismic exploration operation. An exploration ship 10 trails behind it a streamer 12 comprising a number of hydrophones 14. One or more compressed air guns 16 also towed behind the vessel emit pulses of acoustic energy into the water at regular intervals, e.g. every ten seconds. The acoustic energy travels downwardly into the water in all directions; only one ray 17 exemplifying one typical path of the energy is shown, for clarity. Ray 17 enters the sea bed 18 and travels through the various rock layers as indicated. Various amounts of the energy of the ray 17 are reflected at the interfaces between the differing rock layers, so that a large number of different reflections occur; only one reflection at a point P on the interface between two rock layers is shown, again for clarity. The reflected ray travels back upwardly and is ultimately detected by one of the hydrophones 14.

As shown schematically, the direction of the ray path varies in the different rock layers according to Snell's Law. That is, the angles made by the ray at each interface are determined according to the relative velocity of the energy in the layers.

As understood by those of skill in the art, the energy emitted into the structure from a given shotpoint will be reflected from various points on the interfaces and detected by each of the hydrophones. The signal output by each varies as a function of time, and is recorded separately for subsequent analysis.

Assuming that the ship 10 in FIG. 1 is moving to the left, energy imparted by a second shot a few seconds later will pass downwardly and be reflected at the same point P on the interface between the rock layers, but the up-going reflected energy will be detected by a different hydrophone, further astern in the streamer.

Figure 2:
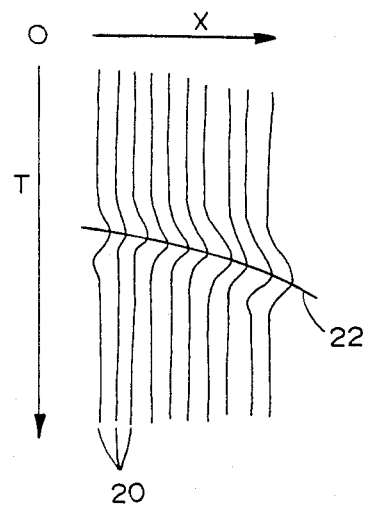
FIG. 2 shows exemplary seismic traces in a shot record, that is, a group of traces from a number of detectors, exhibiting amplitude versus time data, arranged as a function of detector offset.

FIG. 2 shows schematically the "traces" 20 recorded by the hydrophones responsive to a typical shot. In this case each trace 20 represents an amplitude versus time record generated by the hydrophones in FIG. 1. In this Figure the vertical axis is time t extending from zero downwardly and the horizontal axis represents the offset x between the locations of the source 16 and the hydrophone 14 at which the particular trace is recorded. Typically, the traces 20 exhibit a "wiggle" responsive to a reflection event, i.e. reflection of the energy from a particular subterranean interface. The wiggle tends downwardly with increasing offset x, as shown at 22, due to the increase in travel time with increased offset. "Normal move-out correction" is conventionally performed to correct for the variation in travel time in the traces. The traces are then typically also corrected for the velocity in the various subterranean layers. This converts the "time" data recorded into "image" or "depth" data which represents the actual structure.

Accordingly, determining the correct velocities is significant in generating appropriate pictures of the subterranean structure, e.g. for correctly converting the amplitude versus time information recorded to amplitude versus depth information more directly useful to geophysicists and others. The velocity of the sound in the structure may itself provide independent clues to the materials making up the structure.

In order to provide accurate displays of the structure, it is necessary to determine the way in which the seismic energy propagates downward through the structure, is reflected, and returns to the surface to be detected. As discussed, Al-Yahya et al suggest that a wave equation technique is preferred, with ray tracing a possible substitution on the downward going path only.

According to the present invention, a ray tracing technique is used to determine the travel time of the energy in both the downward and upward directions. Two data arrays of travel times corresponding to points on a vertical plane in the structure are established. The data in each array consists of calculated travel times of the energy from the various shotpoint and detector locations to the points on the plane. The recorded data is used to determine the total travel time. Hence, when the sum of the calculated upward and downward travel time values stored at the corresponding locations in the arrays equals the recorded total travel time an actual reflection point has been identified. Ultimately, this information can be used to generate an actual depiction of the subterranean structure.

Figure 3:
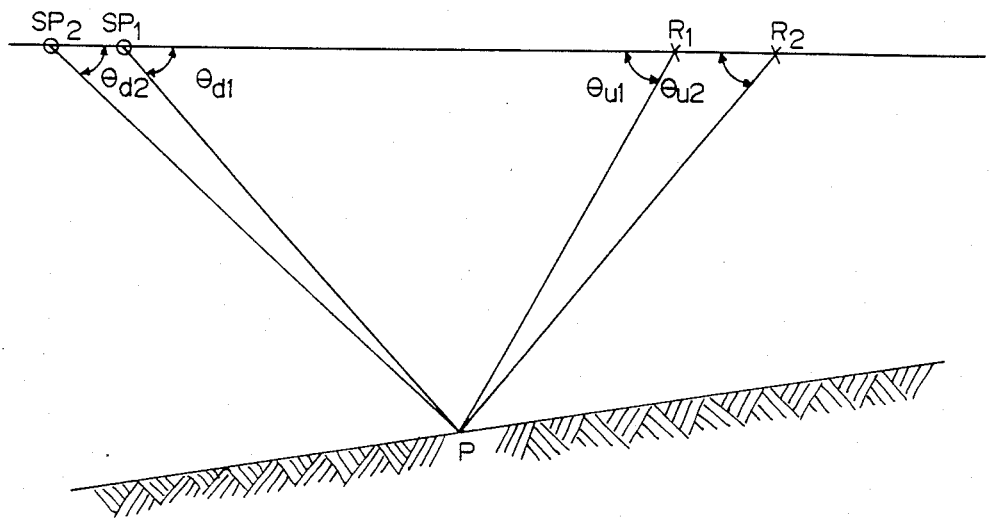
FIG. 3 illustrates the terminology used in explanation of the invention.
Figure 4:
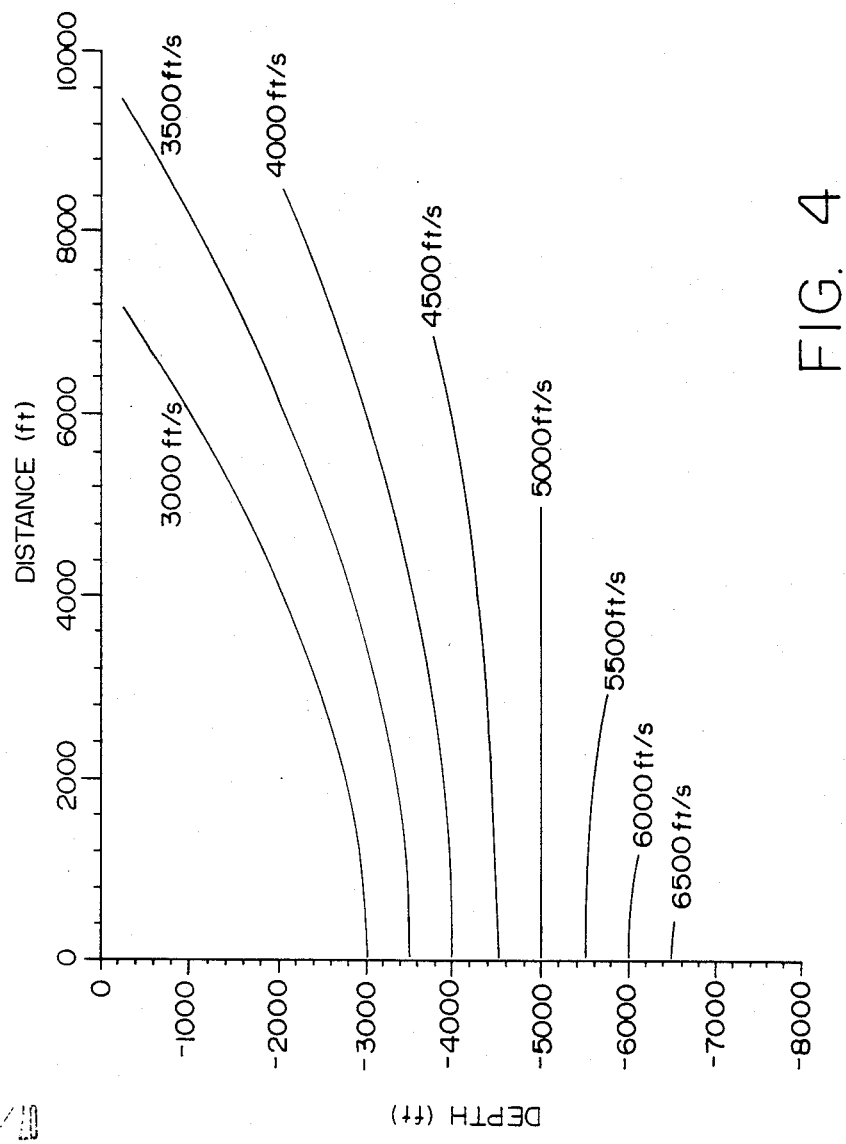
FIG. 4 shows exemplary data illustrating the effects of erroneous velocity selection.

An object of the invention is to provide accurate velocity information so that the best depth images can be constructed. In the process of the invention, common depth point traces corresponding to energy transmitted into the earth at varying shotpoints $SP_1$, $SP_2$, $SP_n$, and reflected from a common depth point P, are recorded at various recording locations $R_1$, $R_2$ ... $R_n$. See FIG. 3, which is a schematic representation of the exploration process depicted in FIG. 1. If these CDP gathers are displayed next to one another after correct prestack depth migration, wiggles in the traces corresponding to the reflection events line up. FIG. 4 shows a number of lines connecting wiggles (i.e. in the manner of line 22 of FIG. 2). The wiggles (not shown) are responsive to events in a number of gathers of traces plotted using various assumed velocities in the depth migration process. When the velocity is correct, the wiggles in the common image point gathers are flat; in the example of FIG. 4, this occurs at a velocity of 5000 ft/s. Note that the interface including the common reflection point need not be horizontal, since the gathers are from a single reflection point.

In a model consisting of a single uniform flat layer and a reflector beneath it, the travel times can be directly calculated as follows:

The angle $\theta_u$ made by the upcoming ray at the surface is related to the offset dx of the detector from the reflection point, the velocity v in the layer, and the portion dt of the total travel time attributable to the upgoing portion of the ray path as follows:

$$\frac{dt}{dx} = \frac{\sin\theta_u}{v} \qquad (1)$$

Processing thus begins by determining the initial velocity v. This is done from measurement of the actual seismic data. Thus, the upcoming rays reach the surface at angle $\theta_u$, as follows:

$$\theta_u = \sin^{-1}\left(v\frac{dt}{dx}\right) \qquad (2)$$

When $\theta_u$ is specified, then the upcoming ray can be back-traced into the earth.

$$x_u = x_o - z\tan\theta_u \qquad (3)$$

$$T_u = T - \frac{z}{\cos\theta_u}\frac{1}{v}$$

Where z is the depth of the reflector in units of length.

Similarly, for the downgoing ray $x_d$ and $T_d$ can be calculated as follows:

$$x_d = z\tan\theta_d \qquad (4)$$

$$T_d = \frac{z}{\cos\theta_d}\frac{1}{v}$$

As indicated above, in this example, the assumption is made that the structure is flat, and a single layer of uniform velocity is modeled. Given that the correct velocity has been determined, the travel times $T_d$ and $T_u$ of the downgoing and up-going rays are equal. The condition for space coincidence (i.e. that the downgoing and upcoming rays intersect at the reflector) is expressed as follows:

$$x_o - z\tan\theta_u = z\tan\theta_d \qquad (5)$$

The following expresses the condition of time coincidence:

$$T - \frac{z}{v}\frac{1}{\cos\theta_u} = \frac{1}{\cos\theta_d}\frac{z}{v} \qquad (6)$$

These imaging conditions specify two equations for two unknowns, $\theta_d$ and z. Solving for z in both cases yields $$z = \frac{vt}{\cos\theta_d^{-1} + \cos\theta_u^{-1}} = \frac{x_o}{\tan\theta_d + \tan\theta_u} \qquad (7)$$

Finally, the image depth z can be eliminated to leave the source ray take off angle $\theta_d$ as the only unknown, as follows:

$$\frac{x_o}{\frac{v}{v_o}\sqrt{x_d^2 + (2z_o)^2}} = \frac{\tan\theta_d + \tan\theta_u}{\sqrt{1 + \tan^2\theta_u} + \sqrt{1 + \tan^2\theta_d}} \qquad (8)$$

where $z_o$ is the true depth of the reflector. The image curve is specified by solving equation 8 for $\theta_u$, substituting the result into equation 7 and solving for z, and into equation 5 and solving for x.

Equation 8 offers a means for generating velocity dependent move out curves for prestacked migration images such as in FIG. 4. The typical final step of stacking and migration, that is, using the derived velocity information for normal move-out correction of the field data recorded (migration) and summing the common reflector traces of each gather to produce a single image trace with improved signal-to-noise ratio (stacking), is well understood in the art. The stacked traces are then displayed alongside other similarly generated traces in order to provide the conventional depiction of the subterranean structure.

Those of skill in the art will recognize that these simple equations will not suffice when complex actual structure is modeled. Instead, numerical techniques are desirably employed, as described below.

Figure 5:
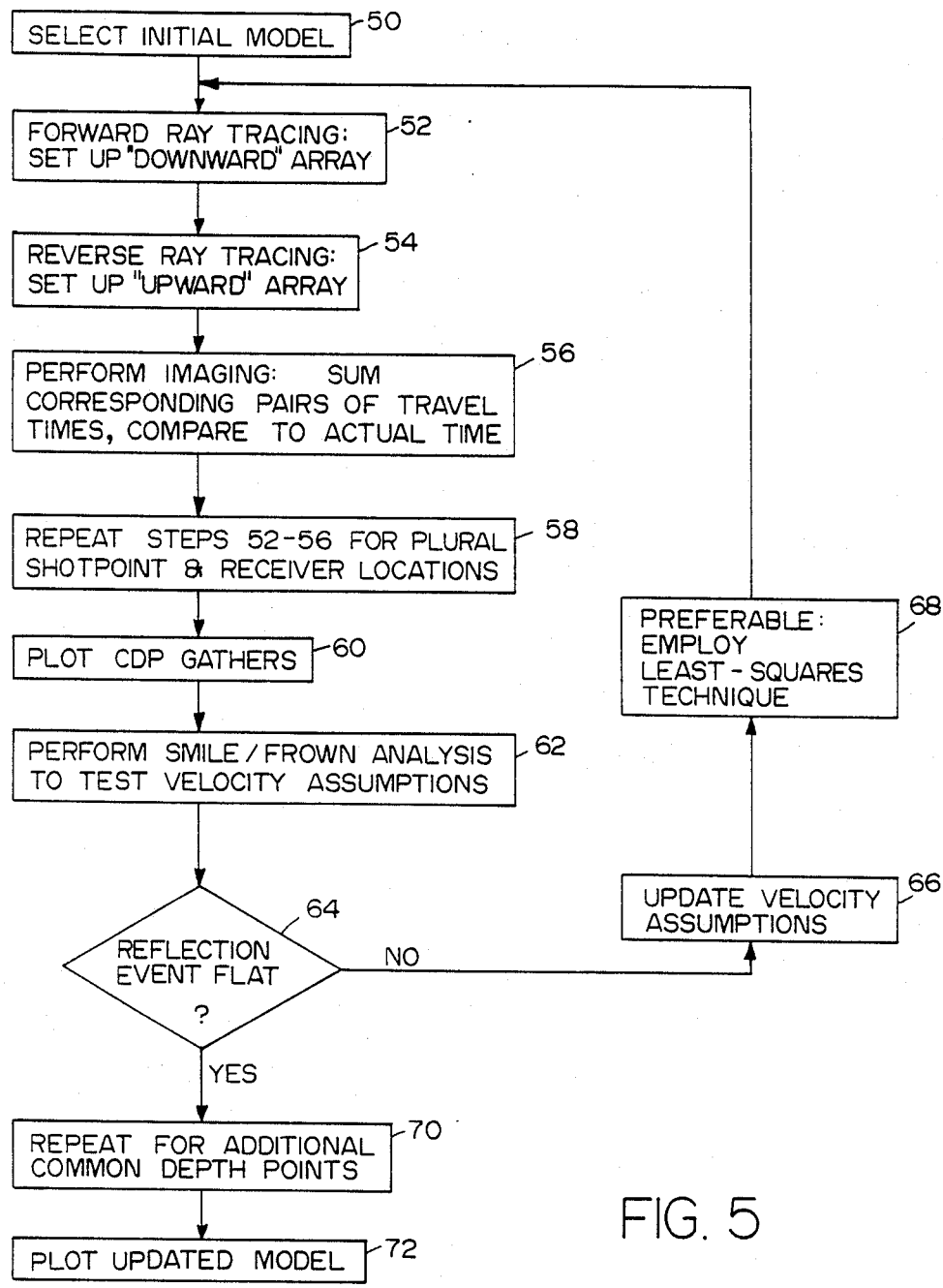
FIG. 5 shows a flow-chart of the method of the invention.

FIG. 5 shows a flow chart of typical processing steps employed in practice of this invention to analyze actual data.

One starts with an initial model in which the recorded data is used together with the experience of the operator to select the initial velocity and structure assumptions. This is depicted as step 50. In step 52, forward ray tracing is performed. As mentioned above, this is done by varying the initial angle at which energy enters the earth and using Snell's Law and the assumed model to calculate the travel time to various points in the earth. These calculated times can be conveniently stored in a two-dimensional "downward" array of storage locations.

In step 54, reverse ray tracing is performed. Preferably, the actual field data is used in accordance with equation (1) above to determine the actual angle of incidence ($\theta_u$) of the rays at the particular geophone locations on the surface of the earth. This process limits the amount of reverse ray tracing which needs to be performed. This process is performed, using the same velocity assumptions as in step 52, yielding a second two-dimensional "upward array" of assumed travel times. The principles of ray tracing are identical for upward going and downward going energy. Accordingly, this step is equivalent to ray tracing upwardly from the points in the modeled structure corresponding to points on the plane.

The result after step 52 is that a number of downward travel times $T_d$ have been generated and stored in a first array, and a like number of upward travel times $T_u$ have also been calculated and stored in a similar array in step 54. The points in the arrays correspond to locations in the assumed structure of the earth.

In step 56 imaging is performed, summing the travel times stored at the locations in the two arrays corresponding to the same position in the earth. When the sum of the upward and downward travel times stored in the corresponding locations in the two arrays equals the actual travel time recorded in the field corresponding to the shot point and detector location under consideration, these points in the arrays are presumed to correspond to the actual ray path. Note that this assumption does not necessarily require that the travel time be equal on both travel paths, merely that the total travel time of the upward and downgoing paths equal the recorded field data. Accordingly, this step does not require that the medium through which the energy passes be uniform, nor that the layers be flat.

As a matter of processing convenience, it may be preferable in steps 54 and 56 to iteratively back-trace rays downwardly from the detector locations, subtract the travel time from the total, store the remainder in a "upward-going array" and compare this to the value for the downward-going ray stored at the corresponding position in the other array. The net result is identical.

In step 58 these steps are repeated for many shotpoints and receiver locations, generating a like number of arrays. The values in each may be compared to determine actual reflection points for a number of rays.

These reflection points are in turn compared to select a "CDP gather" of rays which were reflected from a common point on an interface. A graphic representation of the depths of the reflectors corresponding to the selected common depth point records are plotted next to one another in step 60.

The graphic representations which are plotted may be synthetic traces with "wiggles" located at points corresponding to the depth of the reflector, or may simply be marks spaced from a reference point on the plotted figure. In the latter case, the result is a depiction comparable to one of the lines shown in FIG. 4. The "smile"/"frown" analysis is performed at step 62 to determine whether the velocity assumptions employed were correct. That is, since the records all relate to reflection from a true common reflection point and are actual depth records, when plotted next to one another the representations should be spaced equally from the reference point and should form a straight line, as tested at 64. If not, the velocity and/or structure assumptions of the model are changed, and the process repeated, as indicated at 66.

Steps 56–58 are repeated for a number of additional common depth points, as indicated at 70. When the correct velocities have been determined, the traces of the common depth point gathers can be summed to yield CDP traces. These can then be displayed alongside one another to yield a picture of the structure, as indicated at 72.

Note in particular that because common depth point records are used in the smile/frown analysis to determine the correct velocities, the shape of the reflector is of no concern. Hence, the technique of the invention is not limited to imaging flat structures.

Preferably, in updating the model at step 66, a least squares inversion technique is employed at step 68 to remove the curvature of the common depth point gathers, that is, in minimizing the difference between the records of adjacent image points in a common image point gather. "Inversion" refers to the practice of comparing calculated and ideal data and altering the assumptions which led to the modeled data until the fit is acceptably close. In this case the difference between the curve of the reflection event and a flat line is measured by a least squares calculation. The ray paths are then recalculated based on new assumptions concerning the structure and velocity until the difference is sufficiently small that the model can be taken to be accurate. The entire process is repeated for a number of additional common depth points at 70. Ultimately the updated model is plotted at 72 indicating the actual structure.

Thus it can be appreciated that a ray tracing technique is employed to model the possible ray paths, and that the smile/frown technique is used to determine the accuracy of the assumed velocities with respect to each individual image point. The velocities are corrected as needed, preferably employing the least squares inversion technique to fit the image points to the real data by iterative comparison thereof. The net result is a much more accurate subsurface picture than that of Al-Yahya et al, which attempts to derive an explicit solution to the wave equation, as opposed to the ray tracing/selection of possible rays technique of this invention. According to the invention a more exact and more general solution is provided, which is not limited to a constant velocity situation, as is the Al-Yahya et al technique.

While a preferred embodiment of the invention has been described, this should not be considered as a limitation on the scope of the invention, but merely as exemplary thereof. The invention is to be limited only by the following claims.

What is claimed is:

1. A method for generating an improved cross-sectional depiction of the subterranean structure of the earth, wherein said structure consists of a number of subterranean rock layers characterized by the velocity of seismic energy therein, comprising the steps of:
   (a) recording seismic energy input to the earth at a series of first shotpoint locations, reflected from various interfaces between rock layers within the earth, and detected at various detector locations;
   (b) defining an initial model of the subterranean structure, said model consisting of an assumed sequence of rock layers and corresponding assumptions concerning the velocity of seismic energy therein;
   (c) correcting portions of the modeled structure by:
      (i) generating a first array of calculated downward going travel times corresponding to rays of seismic energy traced from a first shotpoint to various locations in the modeled subterranean structure;
      (ii) generating a second array of calculated upward going travel times corresponding to rays of seismic energy traveling between a first receiver location and said various locations in the modeled subterranean structure;
      (iii) determining a pair of corresponding points in the arrays at which the sum of one of the calculated upward-going travel times and the corresponding one of the downward-going travel times equals the recorded travel time between the corresponding shotpoint and detector locations, and a common depth point corresponding to the determined points in the arrays;
      (iv) repeating said steps (i), (ii) and (iii) to generate a gather of said representations each involving reflection from a common reflecting point;
      (v) correcting said gather of representations for velocity in the modeled structure, to generate common depth point records; and
      (vi) aligning said depth records corresponding to the common reflecting point records with one another, and
      (vii) varying the assumed velocity of seismic energy in the sequence of rock layers assumed in the model used in said correction step until a common depth point reflection event on each of the representations is substantially aligned;
   (d) repeating said steps (i)–(vii) for a number of different shotpoints and detector locations, and repetitively correcting the assumptions of the model concerning the sequence of rock layers and the velocity of seismic energy therein; and
   (e) plotting the corrected model.

2. The method of claim 1 wherein said step of varying the velocities in step (c) (vii) is implemented by performing a least squares fit of the gathered common depth point data records to an ideal line to reduce the difference in depth values for energy traveling from different shot points.

3. A method of determining seismic velocity in the earth, comprising the steps of:
   (i) providing initial assumptions concerning seismic velocity and subterranean structure in a region of interest;
   (ii) generating a first array of calculated downward going travel times corresponding to rays of seismic energy traced from a first shotpoint to various locations in the structure;
   (iii) generating a second array of calculated upward going travel times corresponding to rays of seismic energy traced between various detector locations and points in the structure;
   (iv) determining a point in the structure at which the sum of the calculated upward-going travel times and downward-going travel times coincide with actual travel times recorded with respect to corresponding shot points and detector locations, to determine an actual ray path;
   (v) repeating said steps (ii)–(iv) to determine a number of additional actual ray paths to the same point in the structure from differing shotpoint and detector locations, thus identifying a number of common depth point traces;
   (vi) correcting said identified traces for the velocity of seismic energy through the modeled structure, and generating a gather of corrected common depth point traces corresponding to said determined ray paths;
   (vii) displaying said gather of common depth point traces, said traces being ordered in said display corresponding to the respective shotpoints;
   (viii) examining the shape of reflection events depicted by said ordered displayed traces to determine the accuracy of the velocity assumptions made; and
   (ix) correcting the velocity assumptions accordingly and reperforming said steps (ii) through (viii) until the shape of the reflection events indicates that the correct velocity assumptions have been determined.

4. The method of claim 3, wherein said step of correcting the velocity assumptions includes the step of performing a least squares fit between displayed gathers of the common depth point traces and an ideal display.

* * * * *